(12) United States Patent
Campbell, III et al.

(10) Patent No.: US 10,740,124 B1
(45) Date of Patent: Aug. 11, 2020

(54) COLLABORATIVE COMPUTER-IMPLEMENTED VIRTUAL PLATFORM

(71) Applicant: MASSACHUSETTS MUTUAL LIFE INSURANCE COMPANY, Springfield, MA (US)

(72) Inventors: Allan A. Campbell, III, Wilbraham, MA (US); Patrick H. Nadeau, Wolcott, CT (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 146 days.

(21) Appl. No.: 15/355,477

(22) Filed: Nov. 18, 2016

Related U.S. Application Data (60) Provisional application No. 62/258,307, filed on Nov. 20, 2015.

(51) Int. Cl.
| | |
|---|---|
| *G06F 3/00* | (2006.01) |
| *H04M 3/56* | (2006.01) |
| *G06F 15/16* | (2006.01) |
| *G06F 9/451* | (2018.01) |
| *H04N 7/15* | (2006.01) |
| *H04L 29/06* | (2006.01) |
| *G06F 16/25* | (2019.01) |

(52) U.S. Cl.
CPC ............ *G06F 9/452* (2018.02); *G06F 16/252* (2019.01); *H04L 65/403* (2013.01); *H04L 65/4015* (2013.01); *H04N 7/157* (2013.01)

(58) Field of Classification Search
CPC .... G06F 9/452; G06F 9/4445; G06F 17/3056; H04L 65/403; H04L 65/4015; H04L 12/1822; H04L 12/1831; H04L 63/10; H04L 65/1069; H04L 12/1827; H04L 51/18; H04L 65/4023; H04L 12/1818; H04L 63/20; H04N 7/157
See application file for complete search history.

(56) References Cited

U.S. PATENT DOCUMENTS 8,375,421 B1 * 2/2013 Shigapov ............ H04L 12/1818
726/4
8,656,288 B2 * 2/2014 Roger ................. H04L 12/1822
715/235

(Continued)

*Primary Examiner* — Tan H Tran
(74) *Attorney, Agent, or Firm* — Foley & Lardner LLP (57) ABSTRACT

A method comprises generating and displaying a first and a second user interface on a first and a second computing device. The method comprises receiving a verification value from each of the user interfaces and upon the verification values satisfying a pre-determined threshold, enabling the first and the second user interfaces to communicate. The method comprises receiving a request for a data file associated with the second user operating the second user interface, querying a database for the data file, and transmitting the data file to the first user interface. The method comprises generating a second data file comprising interactions between the first user and the first user interface, the second user and the second user interface, or communication between the first and the second user interfaces. The method further comprises transmitting the second data file to either of the user interfaces or a second database.

18 Claims, 5 Drawing Sheets

(56) References Cited

U.S. PATENT DOCUMENTS

| | | | | |
|---|---|---|---|---|
| 8,972,869 B1* | 3/2015 | Willis | ............... | G06F 17/3005 |
| | | | | 715/753 |
| 2003/0105816 A1* | 6/2003 | Goswami | ............... | G06Q 10/10 |
| | | | | 709/204 |
| 2011/0265157 A1* | 10/2011 | Ryder | ............... | H04L 63/10 |
| | | | | 726/6 |
| 2012/0317485 A1* | 12/2012 | Ding | ............... | G06F 3/1454 |
| | | | | 715/719 |
| 2013/0073621 A1* | 3/2013 | Waddoups | ............... | G06F 21/6218 |
| | | | | 709/204 |
| 2014/0331277 A1* | 11/2014 | Frascadore | ............... | H04L 63/20 |
| | | | | 726/1 |
| 2014/0362742 A1* | 12/2014 | Martinez | ............... | H04M 3/563 |
| | | | | 370/262 |

* cited by examiner

COLLABORATIVE COMPUTER-IMPLEMENTED VIRTUAL PLATFORM

CROSS-REFERENCE TO RELATED APPLICATION

This application claims priority to U.S. Provisional Patent Application Ser. No. 62/258,307, filed on Nov. 20, 2015, which is hereby incorporated by reference in its entirety.

FIELD OF THE DISCLOSURE

The present discloser relates in general to collaboration platform systems and methods, and more specifically to virtual platforms.

BACKGROUND

In-person meetings are the most common approach used by agents to sell products and work in collaboration with other agents within the company. Traditionally, agents would physically meet with other agents and/or customers at a suitable location, but with the ever-increasing distance between locations, the cost and time associated with traditional meetings are becoming less attractive for both parties. As the processing power of computers allow for greater computer functionality and the Internet technology era allows for interconnectivity between computing systems, many institutions have provided software solutions to facilitate the collaboration between agents and between agents and customers. These solutions may include emails, instant messaging, telephone conferences, video conferences, and others. But since the implementation of these more sophisticated online tools, several shortcomings in these technologies have been identified and have created a new set of challenges. For example, above-mentioned solutions tend to be less productive because they are separate solutions limited to address either synchronous or asynchronous collaboration, and may require agents to leave one mode of communication to use another one, which may become complicated and difficult to manage during meetings. In addition, the transfer of information and/or documents from one collaboration tool to another may cause the loss of files and/or edits, the incorrect update of permissions, and the loss of sessions and/or connections, among others. Furthermore, above-mentioned solutions do not provide a method to automatically generate data files related to the virtual meeting.

SUMMARY

For the aforementioned reasons, there is a need for a virtual platform, which may efficiently integrate a variety of collaboration tools in order to overcome these and other drawbacks of current collaboration systems. There is a need for a network and computer-specific solution to increase the efficiency of file generation within these virtual meetings. In an embodiment, a method comprises generating, by a server, a first instruction configured to display, by a server, a first interactive user interface enabling a first user to communicate with a second user and configured to receive a first verification value. The method comprises upon transmitting the first instruction to a first computing device, receiving by the server, the first verification value and generating, by the server, a second instruction configured to generate a second interactive user interface enabling the second user to communicate with the first user and configured to receive a second verification value. The method comprises upon transmitting the second instruction to a second computing device, receiving by the server, the second verification value. The method comprises in response to the first and the second verification values satisfying a pre-determined threshold enabling, by the server, the first and the second interactive user interfaces to communicate, wherein enabling comprises transmitting data generated form the first interactive user interface to the second interactive user interface and transmitting data generated form the second interactive user interface to the first interactive user interface. The method comprises receiving, by the server, a first request form the first interactive user interface for a first data file, wherein the first data file is associated with the second user operating the second interactive user interface. The method comprises generating, by the server, a third instruction configured to receive the first data file. The method comprises upon transmitting the third instruction to the first database, receiving by the server, the first data file. The method comprises transmitting, by the server, the first data file to at least one of the first and the second interactive user interface. The method comprises generating, by the server, a second data file comprising at least one of the interaction between the first user with the first interactive user interface, the interaction between the second user and the second interactive user interface, and the communication between the first and the second interactive user interfaces. The method further comprises generating a fourth instruction configured to transmit the second data file to at least one of the first and the second interactive user interface and a second database.

In another embodiment a computer system comprises a server, which is configured to generate a first instruction configured to display, by a server, a first interactive user interface enabling a first user to communicate with a second user and configured to receive a first verification value. The server is configured to upon transmitting the first instruction to a first computing device, receive the first verification value and generate a second instruction configured to generate a second interactive user interface enabling the second user to communicate with the first user and configured to receive a second verification value. The server is configured to upon transmitting the second instruction to a second computing device, receive the second verification value. The server is configured to in response to the first and the second verification values satisfying a pre-determined threshold enable the first and the second interactive user interfaces to communicate, wherein enabling comprises transmitting data generated form the first interactive user interface to the second interactive user interface and transmitting data generated form the second interactive user interface to the first interactive user interface. The server is configured to receive a first request form the first interactive user interface for a first data file, wherein the first data file is associated with the second user operating the second interactive user interface. The server is configured to generate a third instruction configured to receive the first data file. The server is configured to upon transmitting the third instruction to the first database, receive the first data file. The server is configured to transmit the first data file to at least one of the first and the second interactive user interface. The server is configured to generate a second data file comprising at least one of the interaction between the first user with the first interactive user interface, the interaction between the second user and the second interactive user interface, and the communication between the first and the second interactive user interfaces.

The server is configured to generate a fourth instruction configured to transmit the second data file to at least one of the first and the second interactive user interface and a second database.

BRIEF DESCRIPTION OF THE DRAWINGS

The present disclosure is herein described with reference to embodiments illustrated in the drawings. Other embodiments may be used and/or other changes may be made without departing from the spirit or scope of the present disclosure. The illustrative embodiments described in the brief description are not meant to be limiting of the subject matter presented herein.

DETAILED DESCRIPTION

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

As used here, the following terms may have the following definitions:

"Meeting Number" refers to a multi-digit alphanumeric code (e.g., a 3-digit number) that may allow users, who may two agents or an agent and a customer, to launch a private video conferencing session.

"User" refers to one or more individuals who may be interacting with the virtual platform through a computing device, such as agents, clients, a home office, and others.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

The present disclosure describes a virtual platform, which may integrate a variety of collaboration tools. This platform may provide one or more agents with a virtual collaboration workplace to conduct virtual meetings with customers, while simultaneously using one or more collaboration tools to stay connected with the home office and other agents.

Figure 1:
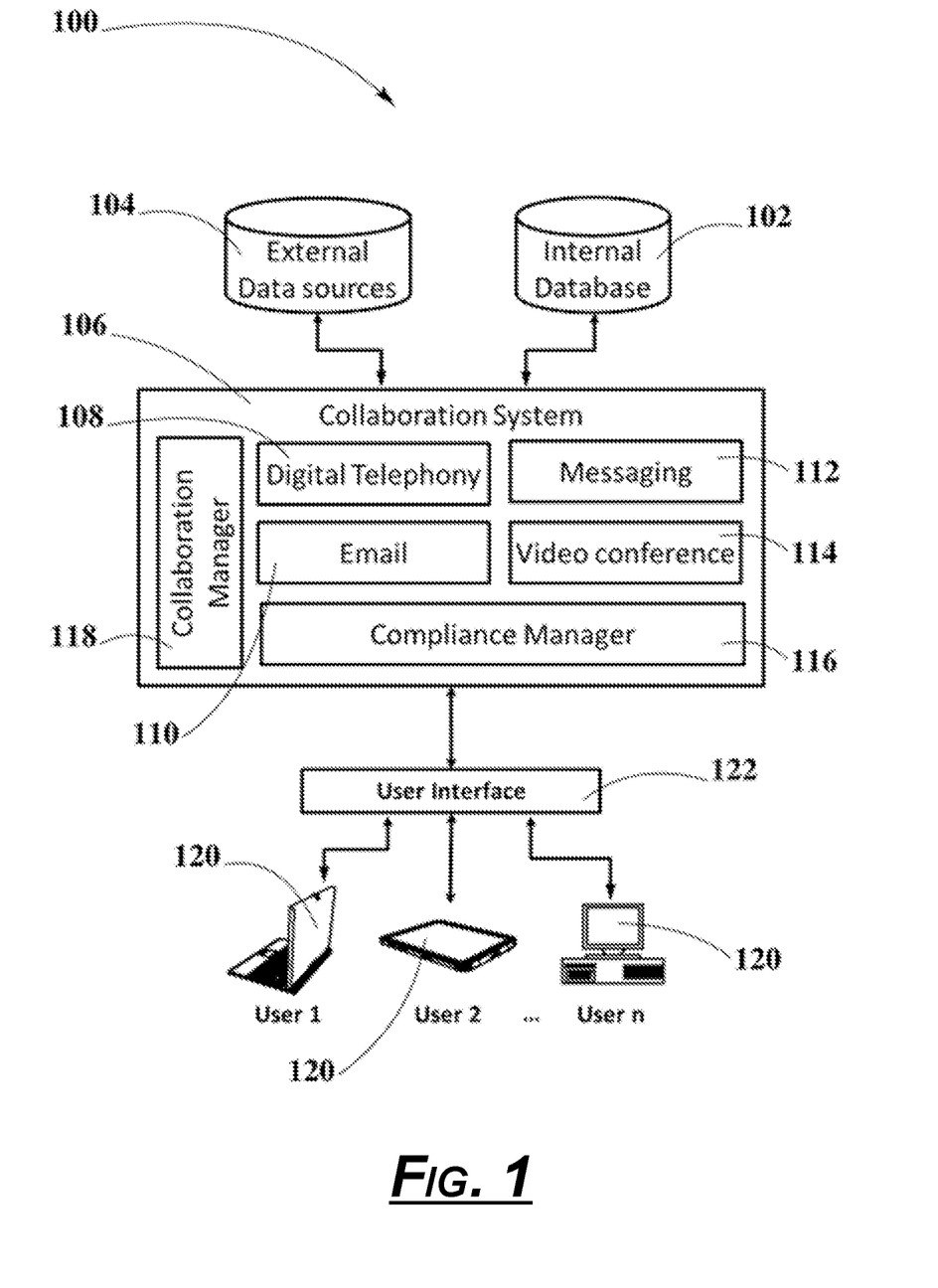
FIG. 1 is a system architecture of a virtual platform, according to an embodiment.

FIG. 1 is a system architecture of a virtual platform 100, according to an embodiment. The disclosed system may include different components, which may dynamically interact with each other through network connections (not shown in FIG. 1). Network connections may refer to any suitable connection between computers, such as, for example, intranets, local area networks (LAN), virtual private networks (VPN), wireless area networks (WAN), and the internet, among others.

Virtual platform 100 may include one or more internal databases 102, one or more external data sources 104, and a collaboration system 106, among others components. Internal database 102 may store data files generated by one or more sub-components operating within collaboration system 106. External data sources 104 may include information derived from external sources such as the World Wide Web, external social networks, external consulting, third party providers, external project sources, and any other suitable external source. Internal database 102 and external data sources 104 may grant access to collaboration system 106 when needed, and may be implemented through known in the art database management systems (DBMS), such as, for example, MySQL, PostgreSQL, SQLite, Microsoft SQL Server, Microsoft Access, Oracle, SAP, dBASE, FoxPro, IBM DB2, LibreOffice Base, FileMaker Pro, and/or any other type of database that may organize collections of data.

Collaboration system 106 may be operatively coupled to internal database 102 and external data sources 104 through suitable network connections, and may include one or more collaboration tools such as digital telephony 108, email 110, messaging 112, video conference 114, and a compliance manager 116, among other components. These collaboration tools may be implemented through software applications obtained from proprietary software and third party providers. Digital telephony 108 tool may provide telephone capabilities for home offices and agents including integrated voice messaging, through applications from providers such as Verizon, and others. Email 110 tool may provide agents with access to email hosted by the company through applications such as Microsoft Outlook and others. Messaging 112 tool may allow an agent to connect with other agents, the home office, and their customers, through instant messaging, presence, and networking features, by using applications such as Microsoft Lync, Salesforce Chatter, and others. Video conference 114 tool may provide agents with capabilities to conduct video calls with customers, the home office and other agents, through integrated video conferencing applications such as Microsoft Lync, Bluejeans network, and others. Compliance manager 116 may provide agents with compliance features including automatic archiving and supervision, through applications such as CA DataMinder, Hearsay social, and others.

Collaboration system 106 may also include a collaboration manager 118, which may interact with other components operating within collaboration system 106, control the operation of virtual platform 100, and process requests from one or more users 120 interacting with a computing device displaying an intelligent user interface 122 generated by virtual platform 100. A person skilled in the relevant art will appreciate that the collaboration manager may be a central server, which controls the operation of the collaboration system. Digital telephony 108, email 110, messaging 112, video conference 114, compliance manager 116, and collaboration manager 118 may include a processing unit for running related algorithms or computer executable program instructions that may be executed by a server, a single computer or multiple computers in a distributed configuration. Processing unit may include a processor with computer-readable medium, such as a random access memory (RAM) coupled to the processor. Examples of processor may include a microprocessor, an application specific integrated circuit (ASIC), and a field programmable object array (FPOA), among others.

Virtual platform 100 may generate a suitable user interface 122 on which a user 120, such as an agent, may interact with one or more collaboration tools operating within collaboration system 106 by means of a computing device. The computing device may be any computer type device such as smartphones, desktop computers, laptop computers, tablets, PDAs, and/or another type of processor-controlled device that may receive, process, and/or transmit digital data. In addition, user interface 122 may be configured to collect information from one or more external data sources 104, and receive and/or feed information to one or more users 120, such as agents and customers.

According to some embodiments, virtual platform 100 may provide agents with a virtual collaboration workplace to stay connected with their customers, the home office, and other agents. In addition, virtual platform 100 may integrate a variety of proprietary and third party applications in a single platform that may simplify their operations. Though this platform, agents may be able to access their email 110 to send and receive information, receive and perform phone 108 calls, receive and send instant messages 112, and conduct video conferences 114 with one or more users 120, among other features. This platform may also assist companies to meet compliance regulations by analyzing data and files generated through the operation of one or more modules within collaboration system 106 and stored in internal database 102. In addition, compliance manager 116 may generate and send reports, which may require immediate review from the compliance team, and reports which may be based on analysis performed to the video and audio call recordings through voice recognition features.

One or more collaboration tools operating within collaboration system 106 may perform a plurality of tasks, which may generate one or more data files that may be stored in internal database 102 for later use. For example, if an agent conducts a video conference 114 meeting with a customer, the agent may collect information from the customer and share with him a complete report of his/her needs. The agent may export this report and may send it to the customer as needed. The agent may also store this report and other files, such as a recording file of the video conference 114 meeting, in internal database 102 for future meetings with the same customer or for performing subsequent analysis requested by the customer.

In another embodiment, virtual platform 100 may be simplified in order to develop a suitable customer version of virtual platform 100, which may be available for free on an application store. This customer version platform may include video conference 114 features that may allow customers to virtually meet with agents and request information concerning one or more products of interest in a simpler, faster and inexpensive manner, without the need to use complex software systems and/or create an account and/or password. Each software version may be designed according to the operating system used by user 120, such as Windows, MAC OS X, Linux, and FreeBSD, among others.

Figure 2:
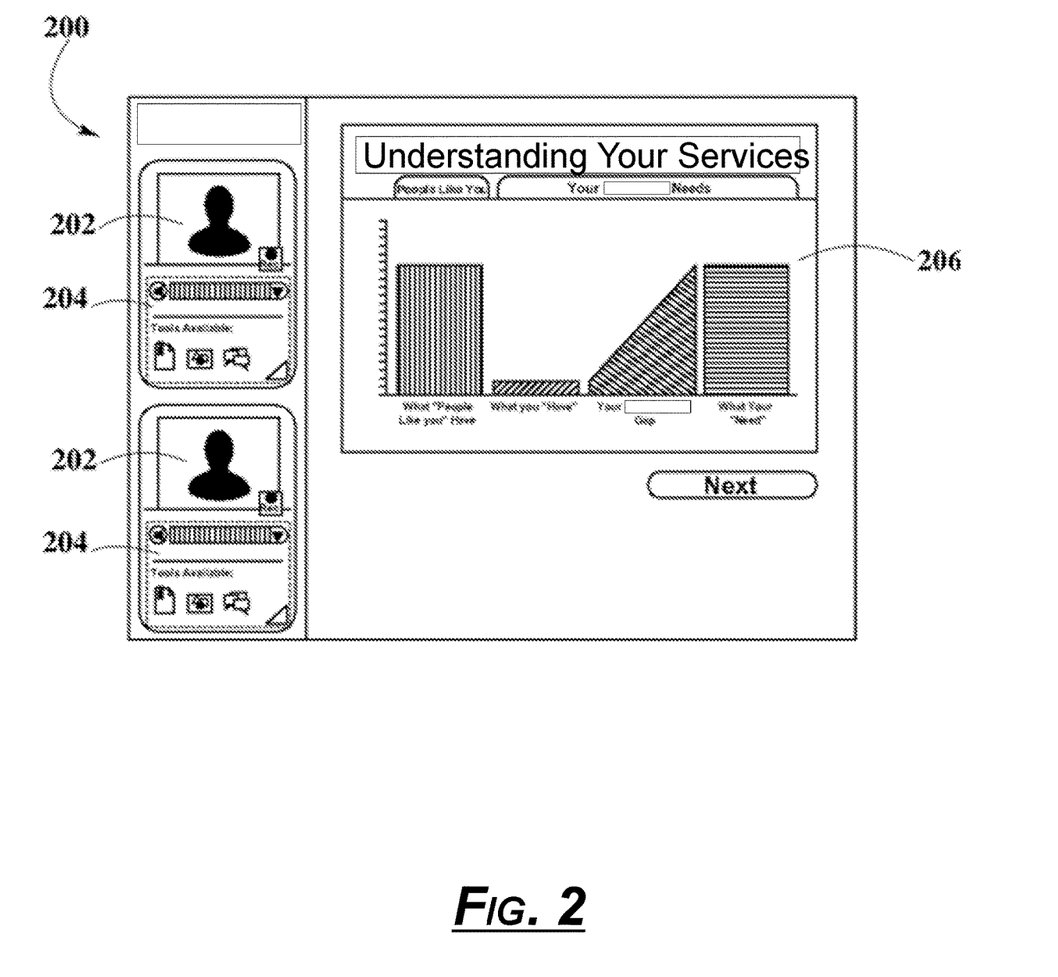
FIG. 2 is an exemplary user interface for conducting virtual meetings, according to another embodiment.

FIG. 2 is an exemplary user interface 200 for conducting virtual, according to another embodiment. User interface 200 for conducting virtual meetings may be generated, for example, by a virtual platform as shown in FIG. 1, which may include different components that may dynamically interact with each other through network connections.

User interface 200 for conducting virtual collaboration may be generated by a virtual platform that may include different components, which may dynamically interact with each other through network connections. Network connections may refer to any suitable connection between computers, such as intranets, local area networks (LAN), virtual private networks (VPN), wireless area networks (WAN), and the internet, among others.

The virtual platform may include a collaboration system, which may be operatively coupled to one or more internal databases and one or more external data sources among other components. Internal database may store data files generated from one or more sub-components operating within collaboration system based on received instructions from the collaboration manager. External data sources may include information derived from external sources such as the World Wide Web, external social networks, external consulting, third party providers, external project sources, and any other suitable external source. Internal database and external data sources may grant access to collaboration system as needed, and may be implemented through known in the art database management systems (DBMS), such as, for example, MySQL, PostgreSQL, SQLite, Microsoft SQL Server, Microsoft Access, Oracle, SAP, dBASE, FoxPro, IBM DB2, LibreOffice Base, FileMaker Pro, and/or any other type of database that may organize collections of data.

Collaboration system may include one or more collaboration tools such as digital telephony, email, messaging, video conferencing, and a compliance manager among other components. These collaboration tools may be implemented through software applications from third party providers. Collaboration system may also include a collaboration manager which may control the operation of the collaboration tools and process requests from one or more users. Each sub-component within collaboration system may include a processing unit for running related algorithms or computer executable program instructions that may be executed by a server, a single computer or multiple computers in a distributed configuration. Processing unit may include a processor with computer-readable medium, such as a random access memory (RAM) coupled to the processor. Examples of processor may include a microprocessor, an application specific integrated circuit (ASIC), and a field programmable object array (FPOA), among others.

The virtual platform may also include a suitable user interface 200 through which one or more users, such as agents and customers, may interact with one or more collaboration tools operating within collaboration system by means of a computing device. The computing device may be any computer type device such as smartphones, desktop computers, laptop computers, tablets, PDAs, and/or another type of processor-controlled device that may receive, process, and/or transmit digital data. In addition, user interface 200 may be configured to collect information from one or more external data sources, and receive and/or feed information to one or more users.

A version of the virtual platform may be designed according to the type of user who may be using the software application and according to the type of operative system used. A complete version of the virtual platform may be designed for agents and may include a variety of collaboration tools to allow them to stay in contact with other agents, the home office, and their customers. This version of the virtual sale platform may allow agents to use one or more collaboration tools simultaneously while conducting a video conference with a customer, and all the collaboration tools may be displayed in a single window or in multiple sub-windows that may include several drop-down menus and/or toolbars with suitable options to manage one or more collaboration tasks. In addition, a simplified version of the virtual platform may be designed for customers, and may include video conference features which may allow them to virtually meet with one or more agents. Each software version may be designed according to the operating system used by the user, such as Windows, MAC OS X, Linux, and FreeBSD, among others.

According to some embodiments, agents may employ a plurality of marketing strategies to attract one or more customers, and may use the video conferencing tool of the virtual platform as a faster, simpler and inexpensive way to conduct initial and follow-up meetings with customers, and offer them product solutions. To conduct a video conference, an agent may advice a customer via email or telephone among others, to download a suitable customer version of the virtual platform, which may be available on the application store of any computing device. The agent may also send the video conference details to the customer, such as the date and time of the meeting, and a meeting number as well. The meeting number may be a string of alphanumeric characters of any length, which may be shared between an agent and a customer who may be conducting the virtual meeting. For example, the meeting number may be a 3-digit number.

When each user launches a version of the virtual platform on their computing devices, a user interface 200 will be shown (e.g., collaboration manager or another server associated with the collaboration system generating and instruction the computing devices to display the user interface 200). The user interface 200 may display a video 202 conference of an agent and a customer; suitable options 204 to access, view, and/or otherwise manipulate the data files and video connection; and any document, video, and/or image that one of the users may wish to share 206 with the second user. Suitable Options 204 may include the function to share screens, share documents, add notes, record video 202 conferences, show a power point or a predetermined sequence of information, highlight information, save data files, and adjust volume, among others. However, the agent version of the software application may include more options than the customer version of the software application.

Figure 3:
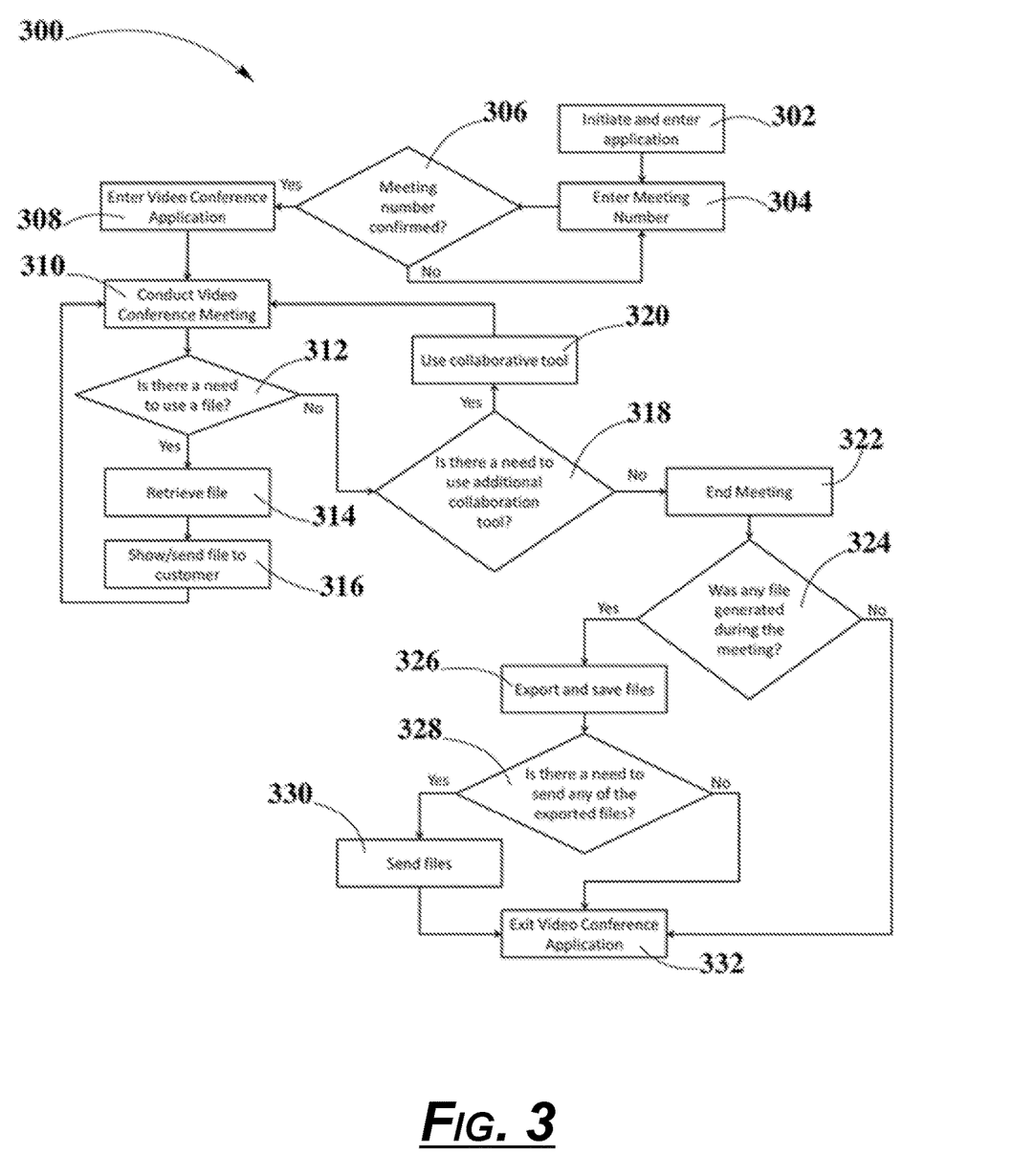
FIG. 3 is a flowchart of a process for conducting virtual meetings, according to a further embodiment.

FIG. 3 is a flowchart of a process 300 for conducting virtual meetings, according to a further embodiment. Process 300 for conducting virtual meetings may be executed, for example, by a virtual platform as shown in FIG. 1, which may include different components that may dynamically interact with each other through network connections. The virtual platform may generate a suitable user interface as shown in FIG. 2, which may provide means for executing one or more steps of process 300. As person skilled in the relevant art will appreciate that a central server such as the collaboration manager or any other central server associated with the collaboration system may generate instruction, transmit such instruction, and modify the functional behavior of the virtual platform. For example, process 300 may include one or more steps, which may be performed by the virtual platform and the person skilled in the art will appreciate that the central server may generate instruction to the virtual platform to operate such actions.

Process 300 for conducting virtual meetings may be executed through a virtual platform that may include different components, which may dynamically interact with each other through network connections. Network connections may refer to any suitable connection between computers, such as intranets, local area networks (LAN), virtual private networks (VPN), wireless area networks (WAN), and the internet, among others. The virtual platform may include a collaboration system, which may be operatively coupled to one or more internal databases and one or more external data sources among other components. Internal database may store data files generated through one or more sub-components operating within collaboration system. External data sources may include information derived from external sources such as the world wide web, external social networks, external consulting, third party providers, external project sources, and any other suitable external source. Internal database and external data sources may be accessed by collaboration system as needed, and may be implemented through known in the art database management systems (DBMS), such as, for example, MySQL, PostgreSQL, SQLite, Microsoft SQL Server, Microsoft Access, Oracle, SAP, dBASE, FoxPro, IBM DB2, LibreOffice Base, FileMaker Pro, and/or any other type of database that may organize collections of data.

Collaboration system may include one or more collaboration tools such as digital telephony, email, messaging, video conferencing, and a compliance manager among other components. These collaboration tools may be implemented through software applications from third party providers. Collaboration system may also include a collaboration manager, which may control the operation of the collaboration tools and process requests from one or more users. Each sub-component within collaboration system may include a processing unit for running related algorithms or computer executable program instructions that may be executed by a server, a single computer or multiple computers in a distributed configuration. Processing unit may include a processor with computer-readable medium, such as a random access memory (RAM) coupled to the processor. Examples of processor may include a microprocessor, an application specific integrated circuit (ASIC), and a field programmable object array (FPOA), among others.

The virtual platform may also include a suitable user interface through which one or more users, such as agents and customers, may interact with one or more collaboration tools operating within collaboration system by means of a computing device. The computing device may be any computer type device such as smartphones, desktop computers, laptop computers, tablets, PDAs, and/or another type of processor-controlled device that may receive, process, and/or transmit digital data. In addition, user interface may be configured to collect information from one or more external data sources, and receive and/or feed information to one or more users.

According to some embodiments of the present disclosure, agents may employ a plurality of marketing strategies to attract one or more customers, and may use the video conferencing tool of the virtual platform as a faster, simpler, and inexpensive way to conduct initial and follow-up meetings with customers, and offer them product solutions. The virtual platform may be designed in two or more suitable versions: an agent version, which may include a variety of collaboration tools to allow agents to stay in contact with other agents, the home office, and their customers; and a customer version, which may be a simplified virtual platform that may include video conferencing features to allow customers to virtually meet one or more agents.

To conduct a video conference, an agent may advice a customer via email or telephone among others, to download a suitable customer version of the virtual platform application software, which may be available on the application store of any computing device. The agent may also send the video conference details to the customer, such as the date and time of the meeting, and a meeting number as well. The meeting number may be a string of alphanumeric characters of any length which may be shared between an agent and a customer who may be conducting the virtual meeting. For example, the meeting number may be a 3-digit number.

Process 300 for conducting virtual meetings may start at step 302, when a customer and an agent launch a suitable version of a virtual platform by interacting with a computing device. Then, at step 304, the customer and the agent may interact with the initial user interface generated by each version of the virtual platform, to enter the agreed meeting number via an input device, such as a touch screen, a mouse, a keyboard, a keypad, and others. The meeting number may be valid for a pre-determined period of time before and after the agreed time. For example, if a customer agrees to virtually meet with an agent at 4:00 pm, then, the meeting number may be valid from 3:30 pm through 4:30 pm on the date of the meeting. At step 306, the collaboration manager (or any other server associated with the collaboration system) may run a confirmation process and may determine if the meeting number corresponds to an active virtual meeting session. If the meeting number can be confirmed, then the customer and/or agent may enter the video conference application at step 308; otherwise, the virtual platform ((or any other server associated with the collaboration system)) may request to enter the meeting number one more time at step 304.

Once the customer and the agent have entered the video conference application, then at step 310, the virtual meeting between the agent and the customer may take place. This meeting may be an initial contact meeting with a new potential customer to offer him a product/solution, or may be a follow-up meeting to address some of the potential customer's concerns. During the video conference meeting the agent may walk the customer through one or more files of interest and collect data from them in order to provide the customer with suitable product solutions that may suit their needs and budget.

As such, at step 312, collaboration manager (or any other server associated with the collaboration system) determines whether there is a need to use one or more files to provide customers with information that may facilitate their decision-making process, then, the agent may retrieve the files from internal database and/or external data sources at step 314, and show and/or send the files to the customer at step 316. Files that may be shared with a customer may include but is not limited to a form, a report, a video, a power point presentation, and a graph. Next, the agent may continue to conduct the video conference meeting at step 310 and may evaluate if there is a need to retrieve additional files. If there is no need to retrieve files, then, at step 318, the agent may evaluate whether he/she has a need to use additional collaborative tools from the virtual platform to connect with the home office and/or other agents. If the agent has a need to use additional collaborative tools, then at step 320, the agent may use one or more collaborative tools in a simultaneous way while conducting the video conference meeting at step 310. If there is no need to retrieve additional files or use additional collaborative tools as part of the virtual meeting, and if the agent has finished conducting the video conference meeting, then, the virtual meeting may end at step 322.

At step 324, if any file was generated during the virtual meeting, then at step 326, the agent may export and save the files on internal database. The agent may also save a recording file of the video conference meeting for performing subsequent analysis requested by the customer. At step 328, if there is a need to send any of the exported files to the customer in order to facilitate his/her decision-making process, then at step 330, those files may be sent (using collaboration manager (or any other server associated with the collaboration system)) to the customer via email or any other suitable mean, and process 300 may end when the agent and customer exit the video conference application at step 332. Otherwise, process 300 may end when the agent and customer exit the video conference application at step 332. At step 324, if no relevant file was generated during the meeting, then process 300 may end when the agent and customer exit the video conference application at step 332.

Figure 4:
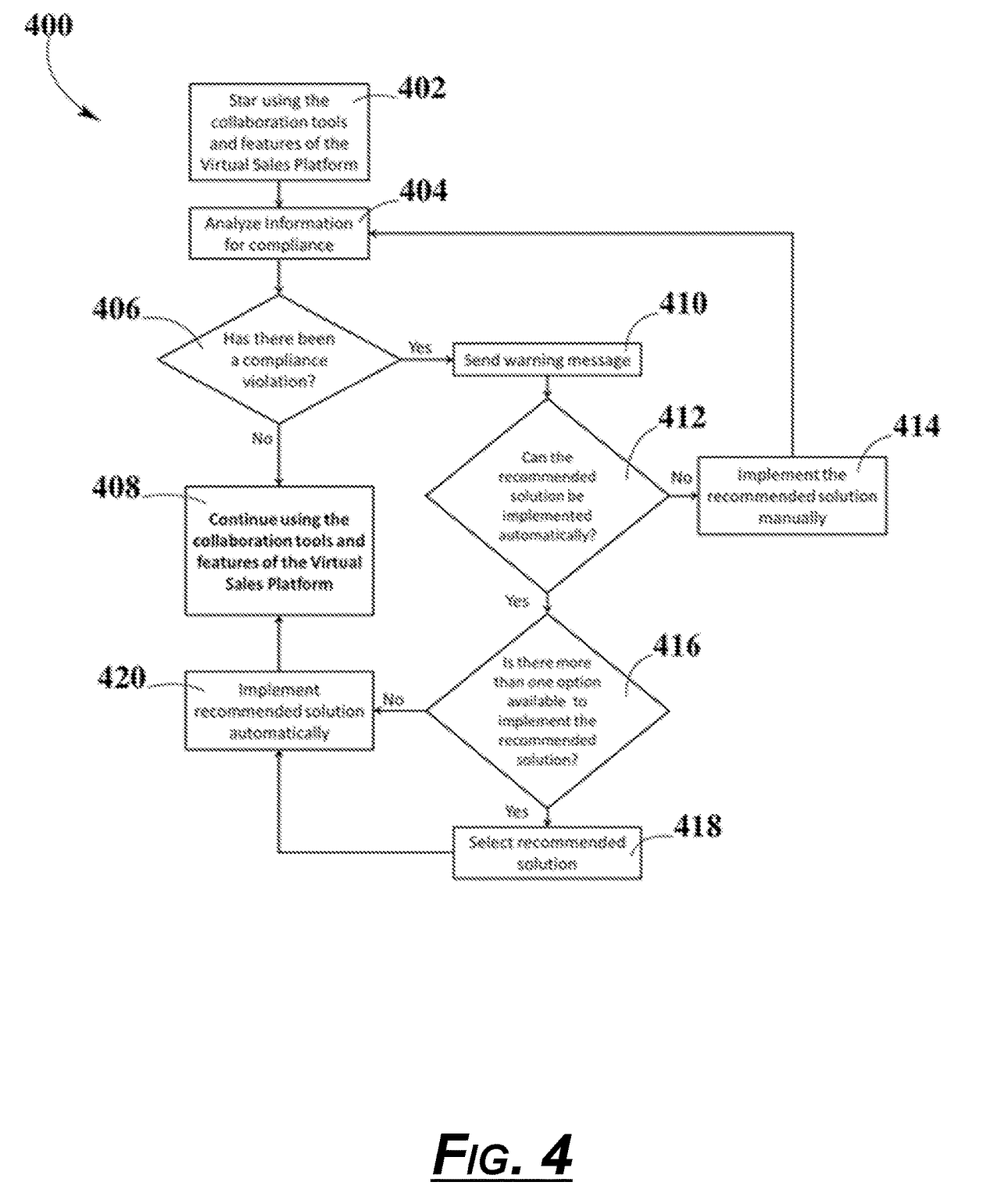
FIG. 4 is a flowchart of a process for detecting and preventing compliance violations in a virtual platform, according to yet another embodiment.

FIG. 4 is a flowchart of a process 400 for detecting and preventing compliance violations in a virtual platform, according to yet another embodiment. Process 400 for detecting and preventing compliance violations in a virtual platform may be executed, for example, by a virtual platform or collaboration manager (or any other server associated with the collaboration system) as shown in FIG. 1, which may include different components that may dynamically interact with each other through network connections. As person skilled in the relevant art will appreciate that a central server such as the collaboration manager or any other central server associated with the collaboration system may generate instruction, transmit such instruction, and modify the functional behavior of the virtual platform. For example, process 400 may include one or more steps, which may be performed by the virtual platform and the person skilled in the art will appreciate that the central server may generate instruction to the virtual platform to operate such actions. Process 400 may be executed before, during, and after a virtual meeting, as described in FIG. 3.

Process 400 for detecting and preventing compliance violations in a virtual platform may start at step 402 when a user starts using one or more collaboration tools and/or one or more features of the virtual platform, by interacting with a computing device displaying a suitable user interface, as shown in FIG. 2. Collaboration tools that may be available to the user in the virtual platform may include email, instant messaging, video call, audio calls, and others. The virtual platform may also provide users with means for storing data and files in one or more databases, sharing data and files in real time, as well as, sending, printing, deleting, modifying, copying and/or otherwise manipulating data and files, among others.

At step 404, the compliance manager operating within collaboration system may analyze the information being generated by the user's activity in the virtual platform, and at step 406, compliance manager may determine whether there has been a compliance violation. If at step 406, the compliance manager determines that there has not been a compliance violation, then at step 408, the compliance manager may allow the user to continue using the collaboration tools and features of the virtual platform.

However, if at step 406, a compliance violation has been detected, then at step 410, compliance manager may display a window providing one or more reasons why the action cannot be performed, as well as, one or more suitable recommended solutions, which may allow the action to comply with the company's internal policies. At step 412, compliance manager may determine whether the recommended solution may be implemented automatically. If the recommended solution cannot be implemented automatically, then at step 414, the user may need to manually implement a suitable solution in order to comply with the company's internal policies. For example, an agent may want to send an email with a customer's information to an external recipient, but if the compliance manager determines that the actions does not comply with the company's internal policies, then the user may decide to ask the manager for authorization to send the information, send the information to internal recipients instead, or not send the information, among other possible solutions provided by the compliance manager.

Alternatively at step 412, if the compliance manager determines that the recommended solution can be implemented automatically, then at step 416, the compliance manager may determine whether there is more than one recommended solution to comply with the company's internal policies. If there is more than one recommended solution to comply with the company's internal policies, then at step 418, the user may select a suitable recommended solution, which may be automatically implemented at step 420, in order to comply with the company's internal policies, and continue using the collaboration tools and features of the virtual platform at step 408. If there is only one recommended solution to comply with the company's internal policies, then at step 420, this solution may be automatically implemented in order to comply with the company's internal policies and continue using the collaboration tools and features of the virtual platform at step 408. A solution, which may be automatically implemented by the compliance manager may be, for example, when an agent is instant messaging with a customer, and the customer decides to share confidential information with the agent; the compliance manager may detect that sharing this information violates one or more internal policies of the company, and may block the information being shared, as a result, the agent may never receive the confidential information.

Figure 5:
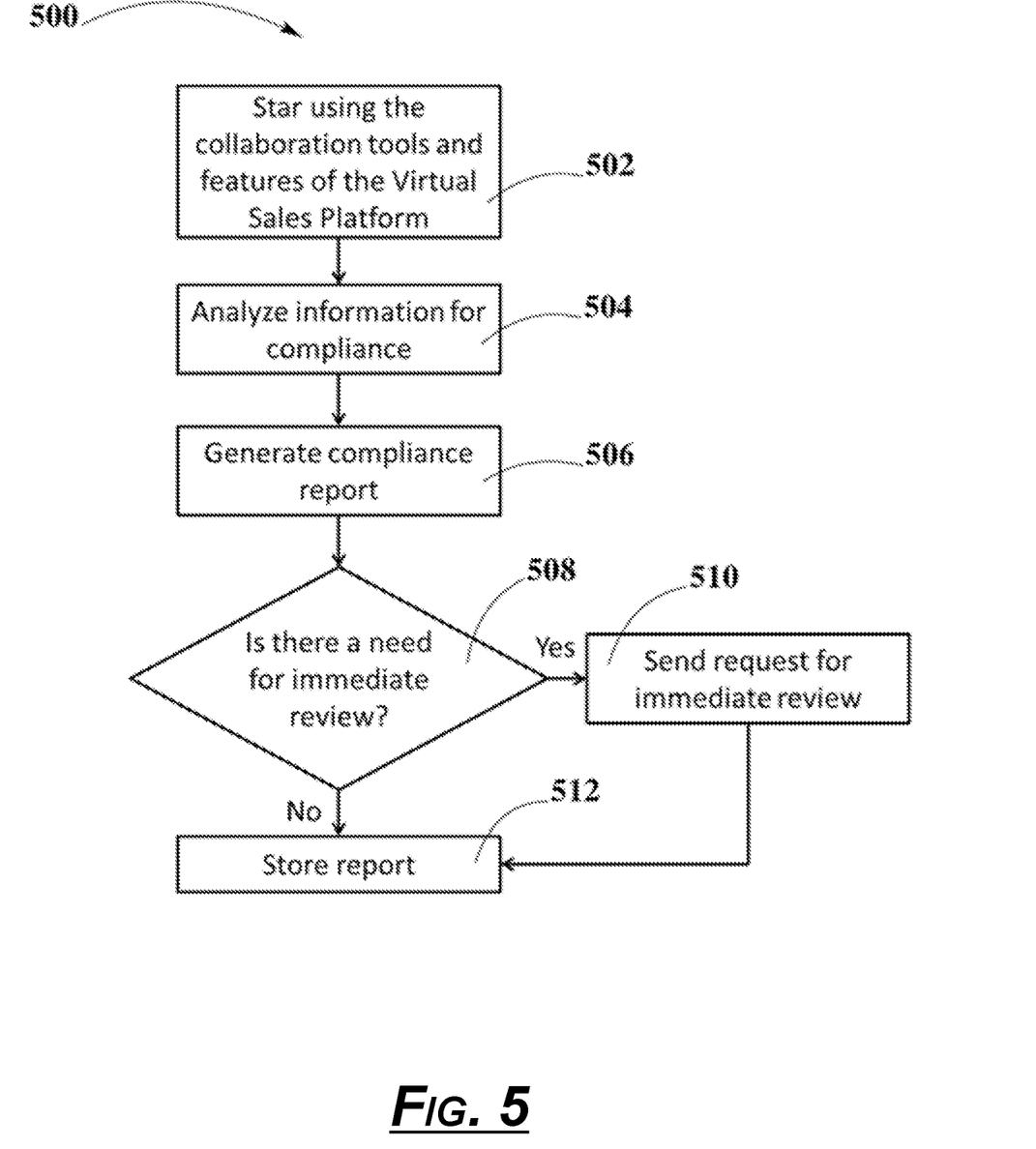
FIG. 5 is a flowchart of a process for generating compliance reports in a virtual platform, according to an even further embodiment.

FIG. 5 is a flowchart of a process 500 for generating compliance reports in a virtual platform, according to an even further embodiment. As person skilled in the relevant art will appreciate that a central server such as the collaboration manager or any other central server associated with the collaboration system may generate instruction, transmit such instruction, and modify the functional behavior of the virtual platform. For example, process 500 may include one or more steps, which may be performed by the virtual platform or the compliance manager and the person skilled in the art will appreciate that the central server may generate instruction to the virtual platform or the compliance manager to operate such actions.

Process 500 for generating compliance reports in a virtual platform may be executed, for example, by a virtual platform as shown in FIG. 1, which may include different components that may dynamically interact with each other through network connections. Process 500 may be executed before, during, and after a virtual session/meeting, as described in FIG. 3.

Process 500 for generating compliance reports in a virtual platform may start at step 502 when a user, who may be interacting with a computing device displaying a suitable user interface, as shown in FIG. 2, may start using one or more collaboration tools and/or one or more features of the virtual platform. The collaboration tools that may be available to the user in the virtual platform may include email, instant messaging, video call, audio calls, and others. The virtual platform may also provide (e.g., be instructed to display by the collaboration manager server) users with means for storing data and files in one or more databases, sharing data and files in real time, as well as, sending, printing, deleting, modifying, copying and/or otherwise manipulating data and files, among others.

At step 504, compliance manager operating within the collaboration system may analyze the data and files being generated by the user's activity in the virtual platform, and at step 506, the compliance manager may generate a report of the compliance violations, which may have been detected. The compliance manager may automatically generate these reports based on the implementation of one or more recommended solutions as described in FIG. 4; and based on analysis performed to the data and files generated through the operation of one or more software modules operating within virtual platform. For example, a report may be generated based on the analysis performed to the video and audio call recordings through voice recognition features.

Next, at step 508, compliance manager may determine whether there is a need for immediate review according to the type of violation against the company's internal policies or other thresholds. If there is a need for immediate review, then at step 510 compliance manager may send the corresponding report to the compliance team, another database, or another computer system. At step 512, compliance manager may store this report in an internal database for further analysis performed by the compliance team, the audit team, and/or the management of the company. Additional reports, which may be generated and sent to the compliance team for immediate review, may be based on one or more detection rules set by the compliance team and applied to evaluate the data and files generated from the interaction of an agent with one or more customers through one or more collaboration tools. These detection rules may be executed by compliance manager through keyword searches, for example, there may be a rule that if an agent says/writes the word guarantee within five letters of the word contract or obligation, then a report will be generated and sent to the compliance team, who may be responsible for performing an in-depth analysis of the information provided by the agent to the customer through video calls, audio calls, instant messaging, email, and others. In an embodiment, the compliance manager may receive a compliance value corresponding to whether the report is in compliance with different company policies. The compliance manager may, upon the compliance value satisfying a pre-determined threshold, display a notification on the user interface of the customer or the agent.

EXAMPLES

Example #1 refers to a virtual meeting employing the process for conducting virtual meetings described in FIG. 3. An agent may attract a customer through a suitable referral program and may send him/her an invite via email to conduct a video conference meeting in order to discuss his/her options. In the email, the agent may advice the customer to download a suitable customer version of the virtual platform application software, which may be available on the application store of any computing device. The agent may also send via email, the video conference details such as the date and time of the meeting, and a meeting number as well. The customer may agree to the meeting and may download the application on his/her tablet.

On the day of the meeting, the agent and the customer may enter the same meeting number on their computing devices displaying the initial user interface generated by the virtual platform, and the meeting may begin. During the meeting, the agent may walk the potential customer through a predetermined sequence of information that may show the potential customer his/her needs, through one or more graphs, as shown in FIG. 2. At the end of the meeting, the agent may offer the potential customer to send him the information reviewed during the meeting, so that the potential customer may analyze it carefully after the meeting. Then, the agent may export and save the files generated during the meeting and may send this information to the potential customer via email. The agent may also save the recording of the video conference in an internal database for further analysis required.

Example #2 refers to a virtual meeting employing the process for conducting virtual meetings described in FIG. 3. An agent may send a potential customer with details for conducting a virtual follow-up meeting with him in order to address some concerns of the potential customer. On the date of the meeting, while conducting the video conference with the potential customer, the agent may obtain from external data sources such as the world wide web, additional information that may help the potential customer with his/her decision-making process. In addition, the agent may also stay in contact with other agents through instant messaging, to receive advices on how to address one or more concerns of the potential customer during the video conference meeting. Example #3 refers to the detection and prevention of compliance violations in virtual platform employing the process described in FIG. 4. The compliance team of a company may perform a review of the information provided by an agent to a customer in order to verify that the agent has complied with the company's internal policies. The compliance team may access the files and data stored in internal database, which may include reports generated through analysis performed to video and audio calls using voice recognition features. The compliance team may evaluate these reports in order to prevent and detect compliance violations when needed.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A computer-implemented method comprising:

generating, by a server, a first instruction configured to display a first interactive user interface enabling a first user to communicate with a second user;

upon transmitting the first instruction to a first computing device, generating, by the server, a second instruction configured to generate a second interactive user interface enabling the second user to communicate with the first user;

upon transmitting the second instruction to a second computing device, enabling, by the server, the first and the second interactive user interfaces to communicate, wherein enabling comprises transmitting data generated from the first interactive user interface to the second interactive user interface and transmitting data generated from the second interactive user interface to the first interactive user interface;

receiving, by the server, a first request from the first interactive user interface for a first data file, wherein the first data file is associated with the second user operating the second interactive user interface;

generating, by the server, a third instruction configured to receive the first data file;

upon transmitting the third instruction to a first database, receiving by the server, the first data file;

transmitting, by the server, the first data file to be displayed on at least one of the first and the second interactive user interfaces;

monitoring, by the server, a modification of the first data file from the first interactive user interface;

executing, by a compliance server, one or more detection rules on the modification to determine whether a predetermined word is present within a predetermined range from a second predetermined word;

when the predetermined word is present within the predetermined range, blocking, by the compliance server, communication between the first interactive user interface and the second interactive user interface;

executing, by the compliance server, one or more compliance rules on the modification to generate a first value;

when the first value satisfies a pre-determined threshold, displaying, by the compliance server on the first interactive user interface a window presenting one or more solutions for enabling the display of the modification on the second interactive user interface; and in response to selection of a first solution within the one or more solutions, executing, by the compliance server, the first solution to display the modification on the second interactive user interface.

2. The method of claim 1, further comprising:

receiving, by the server, from the second database or the compliance server, a compliance value associated with a modified first data file.

3. The method of claim 2, further comprising:

in response to the compliance value satisfying a threshold, no longer enabling the first and the second interactive user interfaces to communicate.

4. The method of claim 3, further comprising:

in response to the compliance value satisfying a threshold, displaying, by the server, a notification associated with the compliance value on at least one of the first and the second interactive user interfaces.

5. The method of claim 1, further comprising:

displaying, by the server, a third data file to at least one of the first and the second interactive user interfaces, wherein the third data file comprises previously generated data associated with at least one of the interaction between the first user with the first interactive user interface, the interaction between the second user and the second interactive user interface, and communication between the first and the second user.

6. The method of claim 1, wherein a modified first data file is stored in a third database, wherein the third database is associated with the first interactive user interface.

7. The method of claim 1, further comprising:

receiving, by the server, a modified first data file from the first interactive user interface; and transmitting, by the server, the modified first data file to the second interactive user interface.

8. The method of claim 1, wherein the first data file is associated with the second user operating the second interactive user interface.

9. The method of claim 1, wherein a modified first data file comprises a video file associated with communication between the first and the second interactive user interfaces.

10. A computer system comprising:

a server configured to:

generate a first instruction configured to display a first interactive user interface enabling a first user to communicate with a second user;

upon transmitting the first instruction to a first computing device, generate a second instruction configured to generate a second interactive user interface enabling the second user to communicate with the first user;

upon transmitting the second instruction to a second computing device, enable the first and the second interactive user interfaces to communicate, wherein enabling comprises transmitting data generated from the first interactive user interface to the second interactive user interface and transmitting data generated from the second interactive user interface to the first interactive user interface;

receive a first request from the first interactive user interface for a first data file, wherein the first data file is associated with the second user operating the second interactive user interface;

generate a third instruction configured to receive the first data file;

upon transmitting the third instruction to a first database, receive the first data file;

transmit the first data file to be displayed on at least one of the first and the second interactive user interfaces;

monitor a modification of the first data file from the first interactive user interface;

a compliance server configured to:

execute one or more detection rules on the modification to determine whether a predetermined word is present within a predetermined range from a second predetermined word;

when the predetermined word is present within the predetermined number of words, block communication between the first interactive user interface and the second interactive user interface;

execute one or more compliance rules on the modification to generate a first value;

when the first value satisfies a pre-determined threshold, display, on the first interactive user interface, a window presenting one or more solutions for enabling the display of the modification on the second interactive user interface; and in response to selection of a first solution within the one or more solutions, executing, by the compliance server, the first solution to display the modification on the second interactive user interface.

11. The computer system of claim 10, wherein the server is further configured to:

receive from the second database or the compliance server, a compliance value associated with a modified first data file.

12. The computer system of claim 11, wherein the server is further configured to:

in response to the compliance value satisfying a threshold, no longer enable the first and the second interactive user interfaces to communicate.

13. The computer system of claim 12, wherein the server is further configured to:

in response to the compliance value satisfying a threshold, display a notification associated with the compliance value on at least one of the first and the second interactive user interfaces.

14. The computer system of claim 10, wherein the server is further configured to:

display a third data file to at least one of the first and the second interactive user interfaces, wherein the third data file comprises previously generated data associated with at least one of the interaction between the first user with the first interactive user interface, the interaction between the second user and the second interactive user interface, and communication between the first and the second user.

15. The computer system of claim 10, wherein the server is further configured to store a modified first data file in a third database, and wherein the third database is associated with the first interactive user interface.

16. The computer system of claim 10, wherein the server is further configured to:

receive a modified first data file from the first interactive user interface; and transmit the modified first data file to the second interactive user interface.

17. The computer system of claim 10, wherein the first data file is associated with the second user operating the second interactive user interface.

18. The computer system of claim 10, wherein a modified first data file comprises a video file associated with communication between the first and the second interactive user interface.

* * * * *